(No Model.)

O. P. BRIGGS.
BARBED FENCE WIRE.

No. 272,407. Patented Feb. 20, 1883.

WITNESSES
D. W. Adams
W. C. Adams

INVENTOR
Orlando P. Briggs.
per W. E. Drayton,
Attorney.

UNITED STATES PATENT OFFICE.

ORLANDO P. BRIGGS, OF CHICAGO, ILLINOIS, ASSIGNOR TO DAVID H. DONOVAN, OF SAME PLACE.

BARBED FENCE-WIRE.

SPECIFICATION forming part of Letters Patent No. 272,407, dated February 20, 1883.

Application filed March 6, 1882. (No model.)

*To all whom it may concern:*

Be it known that I, ORLANDO P. BRIGGS, of Chicago, in the county of Cook and State of Illinois, have invented certain new and useful Improvements in Barbed Fence-Wire; and I do hereby declare that the following is a full, clear, and exact description thereof, reference being had to the accompanying drawings, and to the letters of reference marked thereon, which form a part of this specification.

This invention relates to the double and twisted or cable form of fence-wire provided with four-pointed wire barbs, in which the barbs are secured to the cable by the conformation of the parts joined.

The object of the invention is to provide a construction of the barb, securely joined with the cable, that shall be compact and symmetrical, that shall be easily made, and that shall consume but little wire in the barbs.

Figure 1:
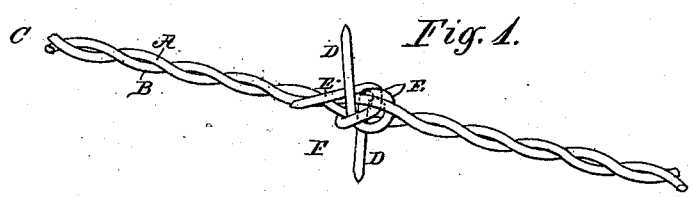
Figure 2:
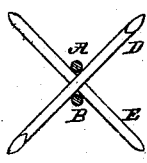
Figures 3, 4:
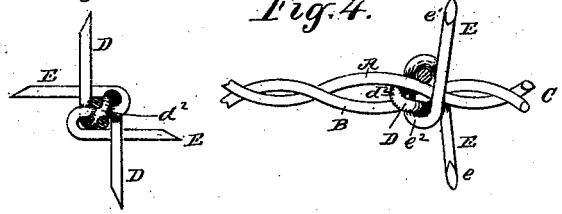
Figure 5:
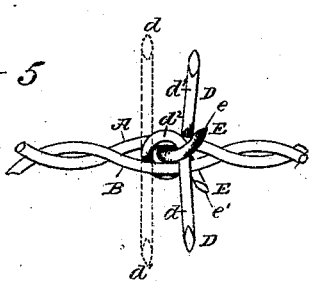
Figure 6:
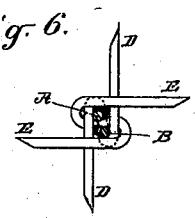

In the drawings, Figure 1 is a perspective view of a barbed section of wire cable containing my improvement. Fig. 2 shows, by a transverse section of the cable-wires, the position of the barb-wires before being bent. Fig. 3, by a section similar to Fig. 2, shows the position and direction of the barb-wires after being bent, when viewed in line with the cable. Fig. 4 is a side view of the barb when completed, the barb-wire last bent being presented at right angles to the line of vision. Fig. 5 is also a side view of the barb, in which the barb-wire that is first bent is presented at right angles to the line of vision. Fig. 6 presents the barb from the side opposite that shown in Fig. 3.

A and B are wires forming the twisted cable C. D and E are the two short-pointed wires forming the complete four-pointed barb F. To speak first briefly of the completed structure, each of the barbs D and E is centrally bent spirally, so as to form an open eye, and the eye of one barb is interlinked with that of the other. Neither eye embraces either of the cable-wires; but the interlinked barbs are made to retain their position on the cable by having the legs of one barb cross those of the other outside the several cable-wires A and B.

To more fully describe the conformation of the parts by which the necessary disposition of the barb-points, and by which the required union of the barbs with the cable are effected, reference will be made to the manner of making the barb, as follows: The barb-wires D and E are first crossed between the cable-wires, as shown in Fig. 2. The ends $d$ and $d'$ of the wire D are then bent forward around the wire E, the end $d$ being carried on one side of the cable in a plane parallel with the cable-wire A, and the end $d'$ on the other side parallel with the cable-wire B, so as to form an open spiral, as indicated plainly in Figs. 3 and 4. Viewed laterally, as seen in Fig. 5, the barb D, thus bent, presents a central eye, $d^2$, through which the wire E passes, and in which, in practice, said wire E will be closely embraced. Next, the barb-wire E is similarly bent, the end $e$ being carried over the cable-wire A and the end $e'$ over the cable-wire B, so that its points stand in the reverse of their original directions, as shown in Figs. 3, 4, 5, and 6. In thus bending the wire E a central spiral coil or open eye, $e^2$, is formed therein, which is interlinked with the eye $d^2$ of the barb D.

In giving the direction described to the ends of the several barb-wires D and E, it will be seen that these two wires are made to cross each other on both sides of the cable, or outside the several cable-wires A and B, by this means closely confining said cable-wires and making firm attachment of such interlinked barbs with the cable. Neither of said cable-wires passes through the eye of either barb.

It will be further observed that, though the barbs be interlinked and crossed between the cable-wires, the latter are not necessarily spread more than the thickness of one barb-wire. This fact, together with the fact that but a single coil is made in each barb-wire, gives symmetry and compactness to the structure, and involves the use of the least possible quantity of wire in forming the barb and effecting its permanent union with the cable.

To make more clear the distinctive construction of the barb F and its attachment with the cable, I mention that the operation of bending the wires D and E, after being crossed between the cable-wires, as shown in Fig. 2, is essentially that of braiding said barb-wires, it being manifest that repeated and successive bendings of the several barbs (of sufficient length) in the manner and order described would result in forming a braided covering about the cable.

By a scrutiny of the several figures of the drawings it is evident that the ends of the barb E will embrace the cable-wires near the end of one of the loops or twists therein, and that its spiral will be spread by less than the diameter of two cable-wires. The barb cannot, therefore, be moved easily toward the middle of the cable-loop, while the intersection of the cable-wires will prevent its movement in the opposite direction. The barb, as a whole, is thus held permanently in place. Any degree of rigidity may be given thereto in bending the barbs to place, as shown.

I claim as my invention—

1. In combination with the cable-wires A and B, the barb-wire D, having a central spiral coil arranged parallel with the cable-wires, as shown, and the wire E, passing through both the cable-loop and the coincident eye of the barb D, and having its ends bent to cross the ends of wire D outside the cable-wires, substantially as described.

2. In combination with the twisted cable-wires A and B, the two barb wires D and E, arranged to intersect each other between the cable-wires, and having their ends bent so that the ends of one barb intersect the ends of the other barb in the form and arrangement of a four-strand braid exterior to the cable-wires, substantially as described.

In testimony that I claim the foregoing as my invention I affix my signature in presence of two witnesses.

ORLANDO P. BRIGGS.

Witnesses:
M. E. DAYTON,
S. ARTHUR WALTHER.